United States Patent
Kadota et al.

(10) Patent No.: US 11,502,369 B2
(45) Date of Patent: Nov. 15, 2022

(54) RUPTURE VALVE AND ENERGY STORAGE DEVICE

(71) Applicants: Robert Bosch GmbH, Stuttgart (DE); GS Yuasa International Ltd., Kyoto (JP)

(72) Inventors: Kohei Kadota, Kyoto (JP); Riku Aikata, Kyoto (JP)

(73) Assignees: GS YUASA INTERNATIONAL LTD., Kyoto (JP); ROBERT BOSCH GMBH, Stuttgart (DE)

( * ) Notice: Subject to any disclaimer, the term of this patent is extended or adjusted under 35 U.S.C. 154(b) by 585 days.

(21) Appl. No.: 16/479,878

(22) PCT Filed: Jan. 25, 2018

(86) PCT No.: PCT/EP2018/051894
§ 371 (c)(1),
(2) Date: Jul. 22, 2019

(87) PCT Pub. No.: WO2018/138226
PCT Pub. Date: Aug. 2, 2018

(65) Prior Publication Data
US 2021/0359373 A1 Nov. 18, 2021

(30) Foreign Application Priority Data

Jan. 27, 2017 (JP) .............................. JP2017-012641
Oct. 19, 2017 (JP) .............................. JP2017-202779

(51) Int. Cl.
*F16K 17/16* (2006.01)
*H01M 50/342* (2021.01)
(Continued)

(52) U.S. Cl.
CPC ......... *H01M 50/3425* (2021.01); *F16K 17/16* (2013.01); *H01G 9/12* (2013.01);
(Continued)

(58) Field of Classification Search
CPC ........... H01M 50/3425; H01M 50/103; H01M 50/107; H01M 50/143; H01M 50/147;
(Continued)

(56) References Cited

U.S. PATENT DOCUMENTS 4,067,154 A * 1/1978 Fike, Jr. .................... E04B 1/98
52/208
5,197,622 A * 3/1993 Anderson .............. B65D 83/70
137/910
(Continued)

FOREIGN PATENT DOCUMENTS

JP H10-172529 A 6/1998
JP H10-284036 A 10/1998
(Continued)

OTHER PUBLICATIONS

International Search Report (ISR) (PCT Form PCT/ISA/210), in PCT/EP2018/051894, dated Mar. 28, 2018.

*Primary Examiner* — Minh Q Le
(74) *Attorney, Agent, or Firm* — McGinn I.P. Law Group, PLLC.

(57) ABSTRACT

A rupture valve is formed on a wall of a container and has a break line along which a wall thickness of the rupture valve is decreased. The break line has an outer edge line which defines an outer edge of an opening region and a plurality of division lines which divide the opening region. The outer edge line has: a first base line and a second base line formed discontinuously such that the first base line and the second base line extend in a first direction, and are formed in a spaced-apart manner in a second direction orthogonal to the first direction; a first support portion forming line formed on a breaking portion of the first base line and extending from the first base line toward the second
(Continued)

base line; and a second support portion forming line formed on a breaking portion of the second base line.

20 Claims, 6 Drawing Sheets

(51) Int. Cl.
*H01G 9/12* (2006.01)
*H01M 50/103* (2021.01)
*H01M 50/15* (2021.01)
*H01M 50/147* (2021.01)

(52) U.S. Cl.
CPC ........ *H01M 50/103* (2021.01); *H01M 50/147* (2021.01); *H01M 50/15* (2021.01); *Y02E 60/10* (2013.01)

(58) Field of Classification Search
CPC .. H01M 50/148; H01M 50/15; H01M 50/159; H01M 50/164; H01M 50/367; H01M 50/375; F16K 17/16; F16K 17/0453; F16K 7/17; H01G 9/12; Y02E 60/10
USPC ........ 137/68.11, 68.19, 68.27, 68.23; 429/56
See application file for complete search history.

(56) References Cited

U.S. PATENT DOCUMENTS

| | | | |
|---|---|---|---|
| 6,180,279 | B1 | 1/2001 | Kinuta |
| 6,607,003 | B1* | 8/2003 | Wilson .................... F16K 17/16 137/68.23 |
| 2004/0172889 | A1* | 9/2004 | Eijkelenberg ........... F16K 17/16 52/99 |
| 2005/0235584 | A1* | 10/2005 | Farwell .................... F16K 17/16 52/202 |
| 2006/0105228 | A1 | 5/2006 | Kim et al. |
| 2010/0224603 | A1* | 9/2010 | Modena ............... B23K 26/364 219/121.72 |
| 2011/0212350 | A1* | 9/2011 | Sato .................. H01M 50/3425 429/56 |
| 2011/0303665 | A1* | 12/2011 | Wilson .................. B65D 90/36 220/89.1 |
| 2012/0040213 | A1* | 2/2012 | Byun .................. H01M 50/342 429/56 |
| 2012/0040214 | A1* | 2/2012 | Kim .................. H01M 50/3425 429/56 |
| 2012/0088128 | A1 | 4/2012 | Matsuura et al. |
| 2012/0114988 | A1* | 5/2012 | Matsuura .......... H01M 50/3425 429/56 |
| 2012/0321943 | A1* | 12/2012 | Ito ........................ H01M 50/543 429/179 |
| 2014/0220395 | A1* | 8/2014 | Ootsuka .............. H01M 50/147 429/56 |
| 2015/0024241 | A1* | 1/2015 | Kim .................... H01M 50/169 429/56 |
| 2015/0280191 | A1* | 10/2015 | Matsudo ........... H01M 50/3425 429/56 |
| 2016/0018014 | A1* | 1/2016 | Modena ............... F16K 17/1606 137/68.27 |
| 2016/0293917 | A1* | 10/2016 | Matsudo ........... H01M 10/0525 |
| 2016/0351871 | A1* | 12/2016 | Gottschalk .............. B32B 37/06 |
| 2017/0194617 | A1* | 7/2017 | Baik .................. H01M 50/172 |
| 2017/0314694 | A1* | 11/2017 | Moro-Le Gall ........ F16K 17/16 |
| 2018/0051819 | A1* | 2/2018 | Pittel ...................... F16K 17/16 |
| 2019/0214619 | A1* | 7/2019 | Li ...................... H01M 10/0525 |
| 2019/0237729 | A1* | 8/2019 | Lee .................... H01M 50/147 |
| 2020/0052265 | A1* | 2/2020 | Wakimoto .......... H01M 50/553 |
| 2020/0227715 | A1* | 7/2020 | Koo .................. H01M 50/578 |
| 2020/0358047 | A1* | 11/2020 | Kim .................. H01M 50/3425 |
| 2020/0395582 | A1* | 12/2020 | Ogawa ............. H01M 50/3425 |

FOREIGN PATENT DOCUMENTS

| | | |
|---|---|---|
| JP | 2004-095457 A | 3/2004 |
| JP | 2006-093146 A | 4/2006 |
| JP | 2010-282850 A | 12/2010 |
| JP | 2012-059496 A | 3/2012 |
| JP | 2013-048038 A | 3/2013 |
| JP | 2015-088382 A | 5/2015 |
| JP | 2015-153471 A | 8/2015 |
| JP | 2016-157570 A | 9/2016 |

* cited by examiner

RUPTURE VALVE AND ENERGY STORAGE DEVICE

TECHNICAL FIELD

The present invention relates to a rupture valve and an energy storage device.

BACKGROUND ART

In general, an energy storage device is formed by accommodating an electrode assembly having a positive electrode and a negative electrode in a gas-tight container together with an electrolyte solution.

In such an energy storage device, there is a possibility that a temperature in the container is increased due to an external cause brought about by an in-use state not generally expected and a combustible gas or the like is generated. To prevent such a possibility, an energy storage device used in general includes a safety valve which releases a gas in the container by opening the container when an internal pressure in the container is increased to a predetermined pressure or more.

As the above-mentioned safety valve, for example, as described in JP-A-2010-282850, there has been known a rupture valve having the configuration where, on a plate-like portion of a container or a plate-like body which seals an opening portion of the container, a plurality of break lines where a thickness of the plate-like portion or the plate-like body is decreased are formed such that the break line ruptures when an internal pressure in the container is increased. In such a rupture valve, a tongue-like portion defined by the plurality of break lines is flipped up toward the outside of the container so that an opening having a predetermined area is formed whereby a gas in the container can be rapidly released.

PRIOR ART DOCUMENT

Patent Document

Patent Document 1: JP-A-2010-282850

SUMMARY OF THE INVENTION

Problems to be Solved by the Invention

Recently, for example, along with the sophistication of performances of electric vehicles, hybrid vehicles and the like, a demand for the increase of a capacity of an energy storage device has been increased. When a capacity of an energy storage device is increased, an amount of gas to be released when an internal pressure of the energy storage device is increased is also increased. Accordingly, along with the increase of a capacity of an energy storage device, it is also necessary to increase an area of an opening which a rupture valve forms for releasing a gas in the container when an internal pressure in the container is increased.

However, when a conventional rupture valve is merely made large in size, there is a possibility that a lifetime of the rupture valve becomes shortened. A container and a rupture valve of an energy storage device repeats expansion and shrinkage due to a fluctuation of a pressure brought about by a change in temperature in a normal in-use state. It is considered that when the rupture valve is made large in size, an amount of deformation of the rupture valve in such a normal in-use state is increased so that a fatigue of a material is increased resulting in shortening of a lifetime.

It is an object of the present invention to provide a rupture valve which can increase an area of an opening, and an energy storage device which includes such a rupture valve.

Means for Solving the Problems

A rupture valve according to an aspect of the present invention is a rupture valve which is formed on a wall of a container and is opened by being ruptured when an internal pressure in the container is increased, wherein the rupture valve has a break line along which a wall thickness of the rupture valve is decreased, the break line has an outer edge line which defines an outer edge of an opening region and a plurality of division lines which divide the opening region, the outer edge line has: a first base line and a second base line formed discontinuously such that the first base line and the second base line extend in a first direction, and are formed in a spaced-apart manner in a second direction orthogonal to the first direction; a first support portion forming line formed on a breaking portion of the first base line and extending from the first base line toward the second base line; and a second support portion forming line formed on a breaking portion of the second base line and extending from the second base line toward the first base line.

Advantages of the Invention

The rupture valve according to an aspect of the present invention, the outer edge line which defines the outer edge of the opening region has: the pair of base lines (the first base line and the second base line) formed discontinuously; and the pair of support portion forming lines (the first support portion forming line and the second support portion forming line) formed in the break portions of the base lines and extending toward the inside of the opening region. Accordingly, an amount of deformation of the rupture valve in a normal use of the energy storage device can be reduced so that a fatigue of the rupture valve is reduced. In this manner, an area of an opening can be increased while allowing the rupture valve to maintain the strength and durability.

MODE FOR CARRYING OUT THE INVENTION

Figure 1:
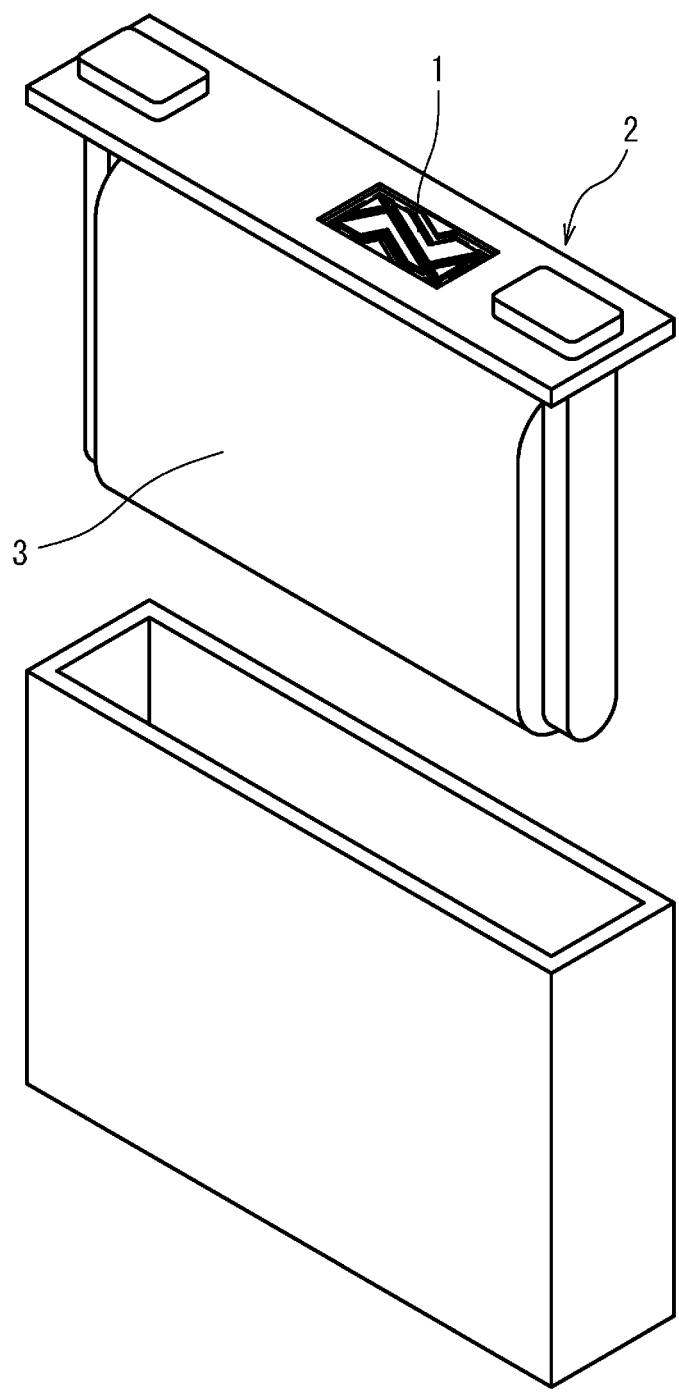
FIG. 1 is a schematic perspective view showing an energy storage device according to one embodiment of the present invention.

According to an aspect of the present invention, there is provided a rupture valve which is formed on a wall of a container and is opened by being ruptured when an internal pressure in the container is increased, wherein the rupture valve has a break line along which a wall thickness of the rupture valve is decreased, the break line has an outer edge line which defines an outer edge of an opening region and a plurality of division lines which divide the opening region, the outer edge line has: a first base line and a second base line formed discontinuously such that the first base line and the second base line extend in a first direction, and are formed in a spaced-apart manner in a second direction orthogonal to the first direction; a first support portion forming line formed on a breaking portion of the first base line and extending from the first base line toward the second base line; and a second support portion forming line formed on a breaking portion of the second base line and extending from the second base line toward the first base line.

In the rupture valve, the outer edge line which defines the outer edge of the opening region has: the pair of base lines (the first base line and the second base line) formed discontinuously; and the pair of support portion forming lines (the first support portion forming line and the second support portion forming line) formed in the break portions of the base lines and extending toward the inside of the opening region. With such a configuration, a support portion which is relatively minimally deformed due to the non-presence of the break line can be formed. With a formation of the support portion, a fatigue of the rupture valve is reduced due to the reduction of an amount of deformation brought about by fluctuation of a pressure in a normal use. Accordingly, the rupture valve can ensure a sufficient lifetime even when an area of an opening is increased by increasing a size of the rupture valve.

In the rupture valve, it is preferable that the plurality of division lines have an intersecting point, and an initiation point of rupture be the intersecting point of the plurality of division lines. In this manner, the plurality of division lines include the intersecting point, and the initiation point of the rupture is formed of the intersecting point of the plurality of division lines. Accordingly, in the rupture valve, even when the initiation point of the opening is set in the inside of the opening region and the area of the opening is increased, a height of a portion of the rupture valve flipped up at the time of rupture can be suppressed.

In the rupture valve, it is preferable that the plurality of division lines include: a first division line which connects the first base line and the second base line to each other; a second division line which connects the first base line and the first division line to each other, and a third division line which connects the second base line and the first division line to each other. With such a configuration, an amount of deformation of the rupture valve in a normal in-use state can be suppressed with more certainty by making the positions of two initiation points of rupture approach to the support portion while maintaining the relatively simple configuration.

In the rupture valve, it is preferable that a distance from an end portion of the first division line to the intersecting point between the second division line and the first division line be ¼ or less of a length of the first division line. Accordingly, by setting the distance from the end portion of the first division line to the intersecting point between the second division line and the first division line to the above-mentioned upper limit or less, a distance between two initiation points of rupture can be increased and hence, it is possible to make the rupture at the time of increase of a pressure occur with certainty by further increasing a stress at the initiation point of rupture while suppressing an amount of deformation of the rupture valve in a normal in-use state.

According to another aspect of the present invention, there is provided an energy storage device which includes: a container which includes the above-mentioned rupture valve; and an electrode assembly accommodated in the container.

The energy storage device has the rupture valve where an area of an opening can be increased while ensuring a sufficient lifetime. Accordingly, when a gas is generated in the container due to a certain abnormality, a gas can be rapidly released to the outside. As a result, the energy storage device can satisfy a demand in markets for the increase of capacity of the energy storage device.

Hereinafter, an embodiment of the present invention is described in detail with reference to drawings when appropriate.

FIG. 1 shows an energy storage device according to one embodiment of the present invention. The energy storage device includes: a container 2 on which a rupture valve 1 is mounted; and an electrode assembly 3 which is accommodated in the container 2. In this specification, the rupture valve 1 per se forms another embodiment of the present invention. In the embodiment shown in the drawing, the rupture valve 1 is formed on a lid portion of the container 2. However, the rupture valve 1 may be formed on a body of the container 2.

The rupture valve 1 is mounted on a wall of the container 2. When an internal pressure of the container is increased, the rupture valve 1 ruptures and is opened. The rupture valve 1 may be integrally formed with the container 2 in a state where a wall thickness of the rupture valve 1 is decreased compared to a thickness of the wall of the container 2. The rupture valve 1 may be also configured such that the rupture valve 1 is formed as a body separate from the container 2 and is gas-tightly and firmly mounted on an opening formed in the wall of the container 2 by welding or the like, for example.

Figure 2:
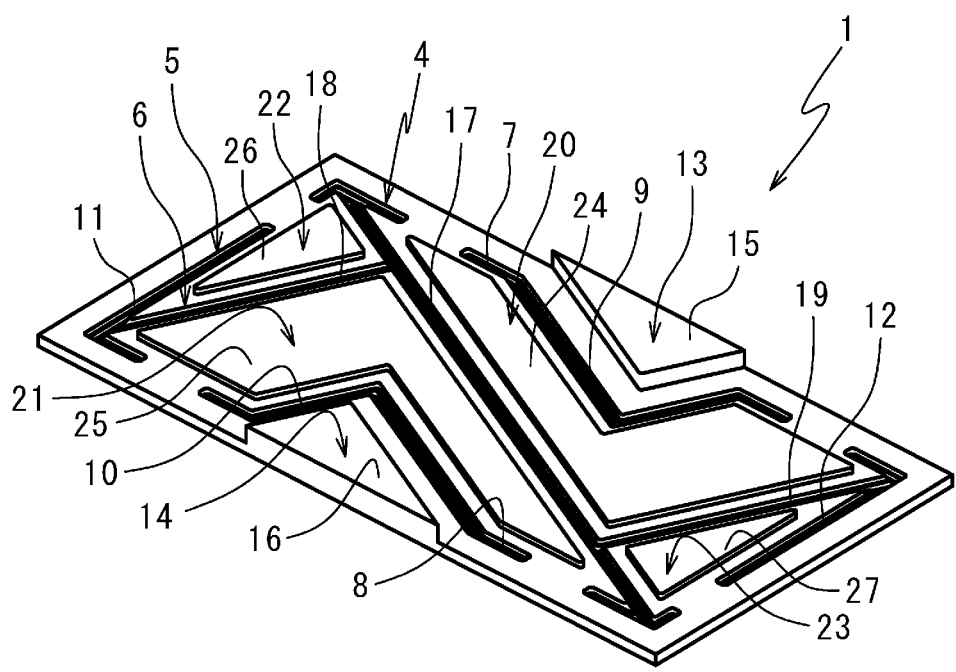
FIG. 2 is a schematic perspective view of a rupture valve of the energy storage device shown in FIG. 1.
Figure 3:
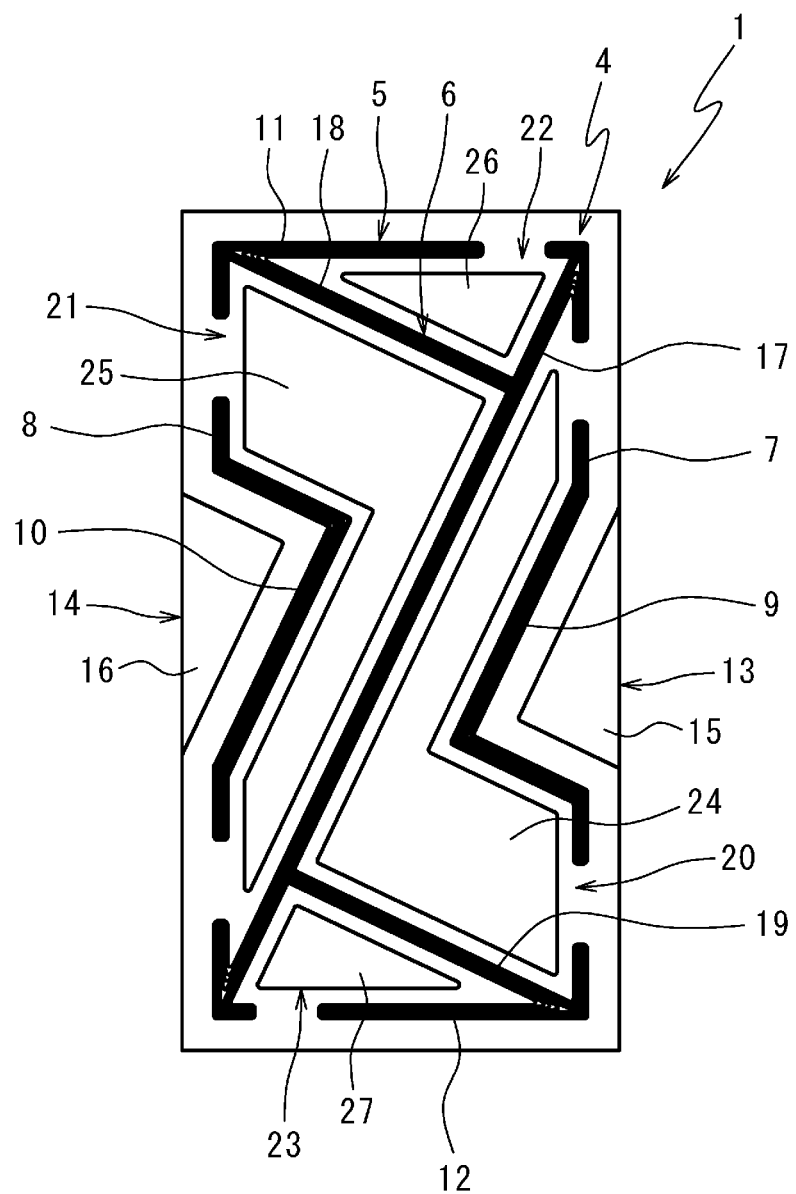
FIG. 3 is a schematic plan view of the rupture valve shown in FIG. 2.

As shown in FIG. 2 and FIG. 3, the rupture valve 1 includes a groove-shaped break line 4 along which a wall thickness of the rupture valve 1 is decreased. The break line 4 ruptures in a torn-off manner when an internal pressure of the container 2 is increased to a predetermined pressure or more. With such a configuration, the rupture valve 1 forms an opening by flipping up a region surrounded by the break line 4 outwardly like a flap.

A predetermined value of a pressure at which the rupture valve 1 ruptures may be set to 1 MPa, for example, although the predetermined value can be changed depending on a design or the like of the container 2, for example.

As a material for forming the rupture valve 1, it is preferable to use metal such as aluminum, copper, nickel or stainless steel. Among these metals, it is particularly preferable to use aluminum from a viewpoint of breakability and workability.

A thickness of a region of the rupture valve 1 within an opening region of the rupture valve 1 where the break line 4 is formed is decided corresponding to a material for forming the rupture valve 1, a planar size of the rupture valve 1, an arrangement of the break line 4 and the like such that the region surrounded by the break line 4 is maintained in a plate shape without being plastically deformed until a pressure reaches a pressure at which the rupture valve 1 is opened. As a target value, a lower limit of an average thickness of the portion of the rupture valve 1 within the opening portion of the rupture valve 1 where the break line 4 is formed, is preferably set to 0.2 mm, and more preferably 0.3 mm. On the other hand, an upper limit of the average thickness of the portion of the rupture valve 1 within the opening region of the rupture valve 1 where the break line 4 is formed is preferably set to 1.0 mm, and more preferably 0.8 mm. By setting the average thickness of the portion of the rupture valve 1 within the opening region of the rupture valve 1 where the break line 4 is formed to the above-mentioned lower limit or more, it is possible to suppress the plastic deformation of the portion of the rupture valve 1 where the break line 4 is formed thus surely preventing a change in pressure at which the rupture valve 1 is opened. Further, by setting the average thickness of the portion of the rupture valve 1 within the opening region of the rupture valve 1 where the break line 4 is formed to the above-mentioned upper limit or less, the rupture valve 4 can be relatively easily formed.

The break line 4 has an outer edge line 5 which defines an outer edge of the opening region of the rupture valve 1 and a plurality of division lines 6 which divide the opening region.

The break line 4 may be formed by removal working. However, the break line 4 can be typically formed by press working using a mold having a projecting portion which corresponds to the break line 4.

It is preferable that the break line 4 be formed on a surface (outer surface) disposed on an outer side of the container 2. However, a place where the break line 4 is formed is not limited to such a place.

A cross-sectional shape of the break line 4 may be formed into a V shape, a semicircular shape, a trapezoidal shape, a shape obtained by stacking these shapes in a multi-stage state or the like, for example. By forming a cross-sectional shape of the break line 4 in a multi-stage state, As described above, a depth of the break line 4 can be increased while ensuring strength of a projecting portion of a press mold and hence, a pressure at which the break line 4 breaks can be easily set to a predetermined value.

Figure 4:
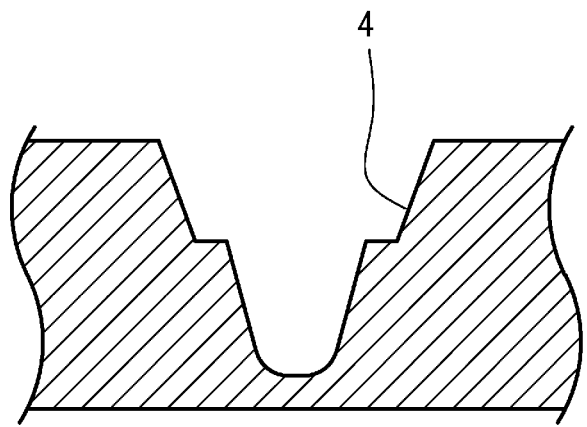
FIG. 4 is a schematic cross-sectional view of a break line of the rupture valve shown in FIG. 2.

It is preferable that, as shown in FIG. 4, a cross-sectional shape of the break line 4 be formed such that depth-side corner portions (corners between a bottom surface and side surfaces) are chamfered roundly. In this manner, by roundly chamfering the depth-side corner portions of the break line 4, irregularities in concentration of stress attributed to an error in working can be suppressed thus stabilizing a pressure at which the rupture valve 1 ruptures. A radius of such a chamfered portion can be set to a value which falls within a range of from 0.3 mm to 1.0 mm inclusive, for example.

A depth of the break line 4 is selected such that the break line 4 breaks at a desired pressure. Accordingly, a suitable depth of the break line 4 largely depends on a material for forming the rupture valve 1 and a thickness of a portion of the rupture valve 1 where the break line 4 is formed. A suitable depth of the break line 4 also differs depending on a planar pattern or the like of the break line 4. As a specific example, in a case where a material for forming the rupture valve 1 is A3003 (aluminum) stipulated in JIS-H4000, a thickness of the rupture valve 1 at a deepest portion of the break line 4 can be set to a value which falls within a range of from 0.03 mm to 0.10 mm inclusive.

The outer edge line 5 has: a pair of base lines (a first base line 7 and a second base line 8) formed discontinuously such that the base lines extend in a first direction and are opposedly formed in a spaced-apart manner in a second direction orthogonal to the first direction; a pair of support portion forming lines formed on break portions of the base lines 7, 8 (portions having no groove) thus partially decreasing a width of the opening region of the rupture valve 1. The support portion forming lines includes: a first support portion forming line 9 formed on the breaking portion of the first base line 7 and extending from the first base line 7 toward the second base line 8 in an inclined manner; and a second support portion forming line 10 formed on the breaking portion of the second base line 8 and extending from the second base line 8 toward the first base line 7 in an inclined manner. The outer edge line 5 further has a pair of end lines (a first end line 11 and a second end line 12) formed discontinuously so as to connect end portions of the pair of base lines 7, 8 to each other.

The pair of support portion forming lines 9, 10 defines support portions (a first support portion 13 and a second support portion 14) which project inward as viewed in a plan view of the opening region of the rupture valve 1. The support portions (13, 14) are relatively minimally deformed by not having the break line 4.

It is preferable that a planar shape of the support portion forming lines 9, 10 be formed into a V shape having two sides respectively inclined in the first direction and the second direction so as to form a corner at distal ends of two sides.

The support portion forming lines 9, 10 are not limited to a combination of a plurality of straight lines, and may be formed of one or a plurality of curved lines. Although not shown in the drawing, for example, the support portions 13, 14 may be formed into a semicircular shape as viewed in a plan view by curved support portion forming lines 9, 10.

As shown in the drawing, thick wall portions (a first support thick wall portion 15 and a second support thick wall portion 16) may be formed on the support portions 13, 14 by increasing a thickness of the thick wall portions for surely preventing the deformation of the rupture valve 1 with more certainty. These support thick wall portions 15, 16 are not limited to the planar thick wall portions shown in the drawing, and may be formed of one or a plurality of rib-shaped portions. The support thick wall portions 15, 16 may be formed so as to be brought into contact with the support portion forming lines 9, 10. However, by forming the support thick wall portions 15, 16 in a spaced-apart manner from the support portion forming lines 9, 10, working of the support portion forming lines 9, 10 can be easily performed.

It is preferable that thicknesses of the support portions 13, 14 at the support thick wall portions 15, 16 be set equal to or less than a thickness of the container around the rupture valve 1 so as to prevent the rupture valve 1 from projecting from the container 2.

Lengths of the pair of base lines 7, 8 in the first direction are larger than a distance between the pair of base lines 7, 8 in the second direction. That is, a length of the opening region of the rupture valve 1 in the first direction along the base lines 7, 8 is set larger than a width of the opening region of the rupture valve 1 in the second direction orthogonal to the base lines 7, 8. A lower limit of a ratio of the length of the base lines 7, 8 in the first direction with respect to the width between the base lines 7, 8 in the second direction is preferably set to 1.5, and more preferably set to 1.8. On the other hand, an upper limit of the ratio of the length of the base lines 7, 8 in the first direction with respect to the width between the base lines 7, 8 in the second direction is preferably set to 3.0, and more preferably set to 2.5. By setting the ratio of the length of the base lines 7, 8 in the first direction with respect to the distance between the base lines 7, 8 in the second direction to the above-mentioned lower limit or above, deformation of the rupture valve 1 brought about by fluctuation of an internal pressure in the container 2 in a normal use state of the energy storage device can be suppressed and hence, a lifetime of the rupture valve 1 can be enhanced with more certainty. Further, by setting the ratio of the length of the base lines 7, 8 in the first direction with respect to the width between the base lines 7, 8 in the second direction to the above-mentioned upper limit or less, the rupture valve 1 having a relative large opening area can be mounted on a surface of the container 2 having a small width. As a lifetime (fatigue resistance) necessary for the rupture valve 1, for example, the rupture valve 1 is set such that even when application and removal of a maximum pressure expected to be used in a normal in-use state of the energy storage device are repeated several tens of thousands times or more, a pressure at which the rupture valve 1 ruptures due to a fatigue is not lowered.

Although end lines 11, 12 may be formed so as to connect corresponding end portions of the base lines 7, 8 to each other straightly as shown in the drawing, the end lines 11, 12 may be formed into a curved shape so as to connect corresponding end portions of the base lines 7, 8 to each other. The end lines 11, 12 may be formed into a semicircular arc shape having no corner between the base lines 7, 8 and the end lines 11, 12.

The division lines 6 include: a first division line 17 which connects a portion of the first base line 7 in the vicinity of a first end portion and a portion of the second base line 8 in the vicinity of the second end portion to each other; a second division line 18 which connects a portion of the second base line 8 in the vicinity of a first end portion and an intermediate portion of the first division line 17 to each other; and a third division line 19 which connects a portion of the first base line 7 in the vicinity of a second end portion and an intermediate portion of the first division line 17 to each other.

An intersecting point between the second division line 18 and the first division line 17 is disposed at a position different from an intersecting point between the third division line 19 and the first division line 17. The intersecting point between the second division line 18 and the first division line 17 and the intersecting point between the third division line 19 and the first division line 17 respectively become initiation points of rupture of the rupture valve 1. That is, the plurality of division lines 6 include a plurality of intersecting points which become initiation points of rupture of the rupture valve 1, and rupture of the rupture valve 1 occurs in such a manner that breaking along the respective division lines 6 advance from these initiation points leading to breaking of the outer edge line 5.

The opening region of the rupture valve 1 is opened such that the opening region is divided into four regions. The four regions is formed of; a first lid portion 20 surrounded by the first base line 7, the first support portion forming line 9, the first division line 17, and the third division line 19; a second lid portion 21 surrounded by the second base line 8, the second support portion forming line 10, the first division line 17, and the second division line 18; a third lid portion 22 surrounded by the first end line 11, the first division line 17 and the second division line 18; and a fourth lid portion 23 surrounded by the second end line 12, the first division line 17 and the third division line 19.

In the outer edge line 5, a breaking portion is formed on outer edges of the respective lid portions 20, 21, 22, 23 such that the break portions become hinges at the time of opening the respective lid portions 20, 21, 22, 23.

A lower limit of a distance from an end portion of the first division line 17 to the intersecting point between the second division line 18 and the first division line 17 is preferably set to 1/15 of a length of the first division line 17, more preferably 1/10 of the length of the first division line 17. On the other hand, an upper limit of the distance from the end portion of the first division line 17 to the intersecting point between the second division line 18 and the first division line 17 is preferably set to 1/4 of the length of the first division line 17, more preferably 1/5 of the length of the first division line 17. By setting the distance from the end portion of the first division line 17 to the intersecting point between the second division line 18 and the first division line 17 to the above-mentioned lower limit or above, a stress can be concentrated on the rupture initiation point thus stabilizing a pressure at which the rupture valve 1 ruptures. Further, by setting the distance from the end portion of the first division line 17 to the intersecting point between the second division line 18 and the first division line 17 to the above-mentioned upper limit or less, a distance between two rupture initiation points can be increased and hence, a maximum deformation amount can be suppressed by dispersing deformation brought about by fluctuation of an internal pressure of the container 2 in a normal in-use state of the energy storage device thus further enhancing a lifetime of the rupture valve 1.

A distance from the end portion of the first division line 17 to the intersecting point between the third division line 19 and the first division line 17 can be set equal to the above-mentioned distance from the end portion of the first division line 17 to the intersecting point between the second division line 18 and the first division line 17. It is preferable that the distance from the end portion of the first division line 17 to the intersecting point between the third division line 19 and the first division line 17 be equal to the distance from the end portion of the first division line 17 to the intersecting point between the second division line 18 and the first division line 17 such that two initiation points start rapture simultaneously.

With respect to the above-mentioned division lines 6, it is preferable that the first support portion forming line 9 which defines a portion of an outer edge of the first lid portion 20 be formed in asymmetrically with respect to the first direction such that a peak point of the support portion forming line 9 in the second direction approaches a peak point of the first lid portion 20. That is, it is preferable that the peak portion of the support portion forming line 9 approaches the intersecting point between the first division line 17 and the third division line 19. With such a configuration, the first support portion 13 is formed in the vicinity of the initiation point (the intersecting point between the first division line 17 and the second division line 18) of rupture where an amount of deformation of the rupture valve 1 along with the fluctuation of a pressure in a normal in-use state of the energy storage device is liable to be increased and hence, the deformation of the rupture valve 1 is suppressed whereby a fatigue of the rupture valve 1 can be reduced. As the rupture valve 1 having such a configuration, it is preferable that the support portion forming line 9 be formed into an asymmetry V shape having an oblique side parallel to the first division line 17 and an oblique side parallel to the second division line 18.

Similarly, it is preferable that the second support portion forming line 10 which defines a portion of the outer edge of the second lid portion 21 be formed in asymmetry with respect to the first direction such that a peak point of the second support portion forming line 10 in the second direction approaches a peak point of the second lid portion 21, that is, to the intersecting point between the first division line 17 and the second division line 18.

On four lid portions 20, 21, 22, 23 defined by the break line 4, as shown in the drawing, lid thick wall portions (a first lid thick wall portion 24 of the first lid portion 20, a second lid thick wall portion 25 of the second lid portion 21, a third lid thick wall portion 26 of the third lid portion 22, and a fourth lid thick wall portion 27 of the fourth lid portion 23) may be formed. These thick wall portions prevent plastic deformation of the lid portions 20, 21, 22, 23 respectively by increasing thicknesses of the lid portions 20, 21, 22, 23 respectively.

It is preferable that thicknesses of the lid thick wall portions 24, 25, 26, 27 of the rupture valve 1 be set smaller than thicknesses of the support thick wall portions 15, 16.

As described above, since the rupture valve 1 has the support portions 13, 14 so that a fatigue of the rupture valve 1 is reduced and hence, rupture valve 1 can increase the opening area of the rupture valve 1 while ensuring a sufficient lifetime. Accordingly, in the energy storage device which includes the rupture valve 1, even when an abnormal state occurs where a gas is generated in the container 2, it is possible rapidly release the generated gas to the outside of the container 2.

Figure 5:
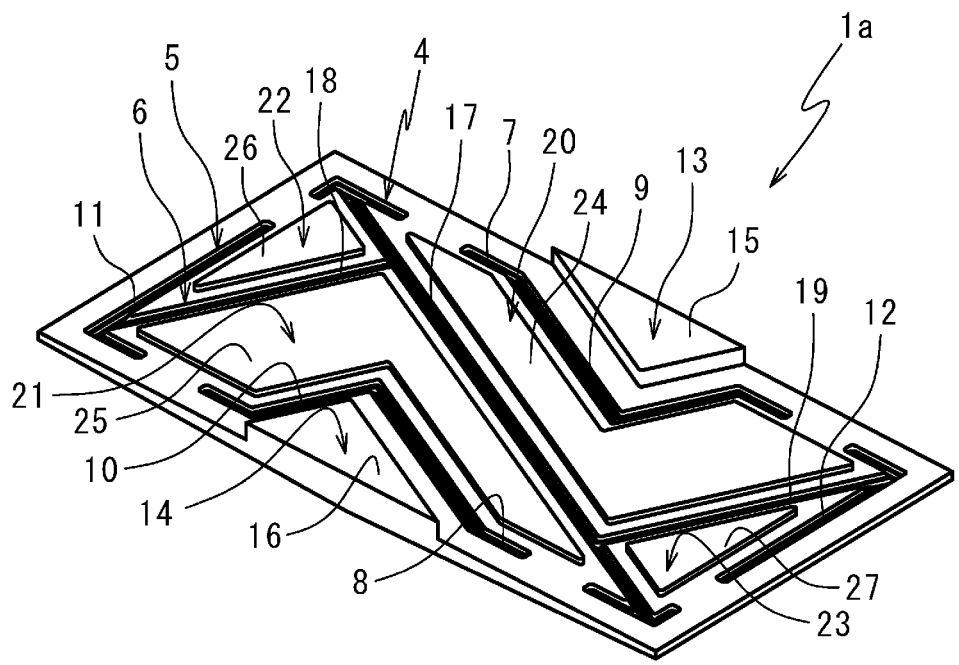
FIG. 5 is a schematic perspective view of a rupture valve different from the rupture valve shown in FIG. 2.

FIG. 5 shows a rupture valve 1a according to an embodiment different from the embodiment shown in FIG. 2 of the present invention. The rupture valve 1a can be used in the energy storage device shown in FIG. 1 in place of the rupture valve shown in FIG. 2.

The rupture valve 1a shown in FIG. 5 includes a groove-shaped break line 4 on a front surface side thereof (on an outer surface side of the energy storage device) by decreasing a wall thickness of the rupture valve 1a along the break line 4. The break line 4 breaks in a torn-off manner when an internal pressure of the container 2 is increased to a predetermined pressure or more. With such a configuration, in the rupture valve 1a, a region surrounded by the break line 4 outwardly is flipped up so that an opening is formed.

A front-surface-side uneven shape formed on the rupture valve 1a shown in FIG. 5 including the break line 4 can be made substantially equal to a front-surface-side uneven shape formed on the rupture valve 1 shown in FIG. 2. Accordingly, constitutional elements of the rupture valve 1a shown in FIG. 5 identical with the corresponding constitutional elements of the rupture valve 1a shown in FIG. 2 are given the same symbols, and repeated description of these constitutional parts is omitted. Further, as a material for forming the rupture valve 1a shown in FIG. 5, the same material as the rupture valve 1 shown in FIG. 2 can be used.

Figure 6:
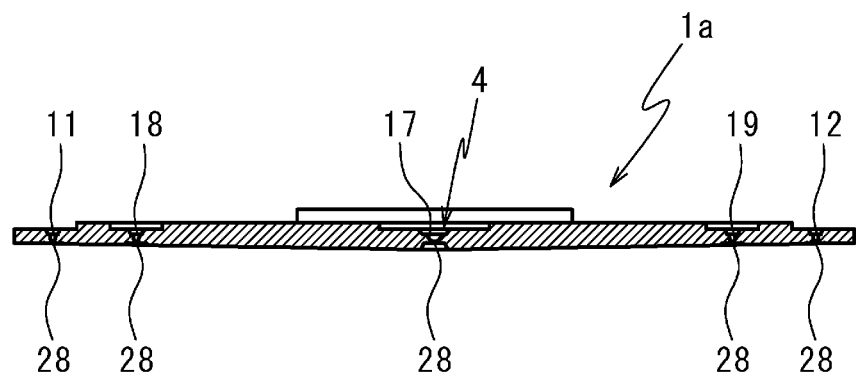
FIG. 6 is a schematic cross-sectional view of the rupture valve shown in FIG. 5.

As shown in FIG. 6, in the rupture valve 1a of this embodiment, a back surface of the rupture valve 1a is inclined such that a wall thickness of the rupture valve is gradually increased from both ends in the longitudinal direction toward the center in the longitudinal direction as viewed in a horizontal view.

An adjusting groove 28 corresponding to the break line 4 is formed on a back surface side the rupture valve 1a. The adjusting groove 28 is formed to have a depth which makes a thickness of the rupture valve 1a at a deepest portion of the break line 4 to have a predetermined depth from the front surface of the rupture valve 1a. That is, the adjusting groove 28 is formed such that the position of the recessed portion in a thickness direction can be fixed. With such a configuration, a cross-sectional shape of the break line 4 can be made fixed and hence, the measurement of concentration of a stress brought about by the break line 4 along with the increase of an internal pressure of the container 2 can be made easily.

The cross-sectional shape of the break line 4 of the rupture valve 1a shown in FIG. 5 and a thickness of the rupture valve 1a a deepest portion of the break line 4 can be made equal to a cross-sectional shape of the break line 4 of the rupture valve 1 shown in FIG. 2 and a thickness of the rupture valve 1 at a deepest portion of the break line 4.

The rupture valve 1a of this embodiment is formed such that a wall thickness of the rupture valve is gradually increased from an outer side to an inner side as viewed in a horizontal view and hence, a strength of a center portion at which concentration of a stress becomes large is increased. Accordingly, the rupture valve 1a exhibits small deformation against the increase of an internal pressure of the container 2 within a normal in-use range and hence, the rupture valve 1a is strong against a fatigue, and a fluctuation of a pressure of the rupture valve 1a is small.

The above-mentioned embodiments are not intended to limit the configuration of the present invention. Accordingly, it should be construed that the above-mentioned embodiments can be modified by omission, replacement or addition of constitutional elements of respective parts of the embodiments based on the description of this specification and the common general technical knowledge, and all these modifications also fall within the scope of the present invention.

The rupture valve may include four or more division lines. As an example, the rupture valve may include: a first division line formed at the center between a pair of base lines in parallel to the base lines while having a length shorter than a length of the base line; and four second division lines formed so as to connect end portions of the first division line and end portions of the pair of base lines respectively.

The rupture valve may be configured such that a wall thickness of the rupture valve is increased from the outside to the inside in a lateral direction. Further, a surface of the rupture valve may be inclined such that a wall thickness of the rupture valve is increased from the outside to the inner side as viewed in a horizontal view.

EXAMPLES

Hereinafter, although the present invention is described in detail with reference to examples, it should not be construed that the present invention is limited by the description of these examples.

Rupture valve models 1 to 5 shown in FIG. 7 to FIG. 11 are formed by modeling on a computer, and a Mises stress and a maximum deformation amount under a normally-used pressure condition are calculated by simulation.

<Model 1>

Figure 7:
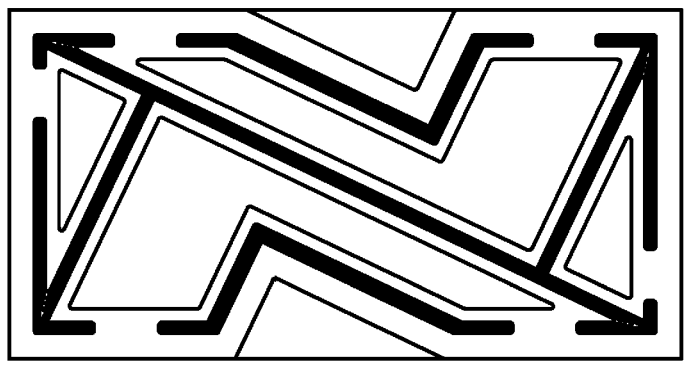
FIG. 7 is a plan view of a model 1 of a rupture valve.

As shown in FIG. 7, the model 1 has a shape according to the above-mentioned embodiment with modification, and as a material physical property, a value corresponding to A3003 (aluminum) stipulated in JIS-H4000 is used.

To be more specific, in the model 1, a total length is set to 25 mm, a width is set to 6.5 mm, and a wall thickness of a division line forming portion is set to 0.4 mm. A division line is formed such that a wall thickness of the model 1 at a deepest portion of the division line becomes 0.05 mm. A pair of base lines is formed such that a length (a distance between center lines of a pair of end lines) is set to 22.7 mm, and a distance between center lines of the pair of base lines is set to 10.7 mm. A second division line and a third division line are formed perpendicular to a first division line. As a result, a distance from an end portion of the first division line to an intersecting point between the second division line and the first division line and a distance from an end portion of the first division line to an intersecting point between the third division line and the first division line are set to 18% of the length of the first division line. A support portion forming line is formed of an inclined side parallel to the first division line and an inclined side parallel to the second division line or the third division line, and is configured such that a length in the first direction (a length of a breaking portion of the base line) is set to 9.1 mm, and a projection height in the second direction is set to 3.5 mm. A support thick wall portion is configured such that a distance from the break line (support portion forming line) is set to 1.0 mm, and a wall thickness is set to 1.0 mm. A lid thick wall portion is configured such that a distance from the braking line is set to 0.5 mm, and a wall thickness is set to 0.6 mm.

<Model 2>

Figure 8:
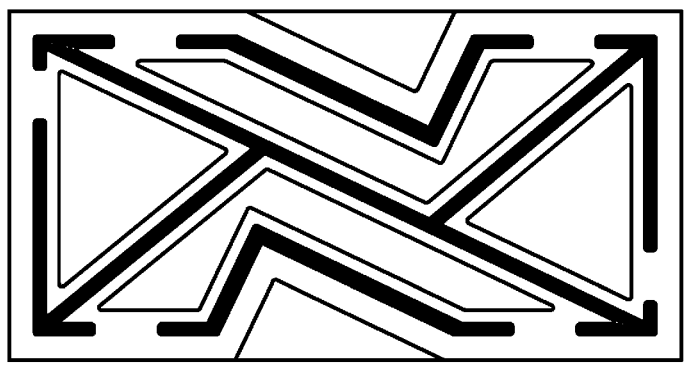
FIG. 8 is a plan view of a model 2 of the rupture valve.

The model 2 shown in FIG. 8 is substantially equal to the model 1 except for a point that a second division line and a third division line are formed such that a distance from an end portion of a first division line to an intersecting point with the first division line is set to 36% of a length of the first division line.

<Model 3>

Figure 9:
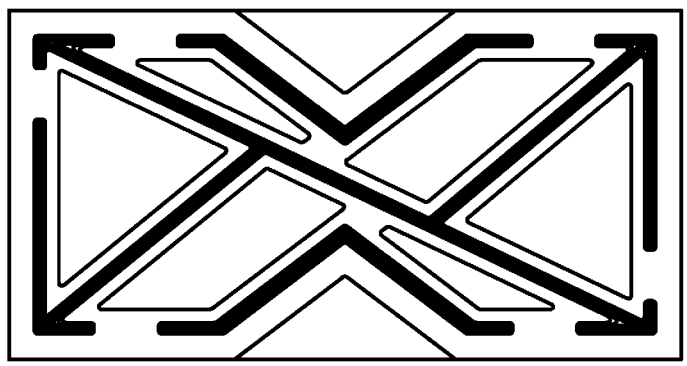
FIG. 9 is a plan view of a model 3 of the rupture valve.

The model 3 shown in FIG. 9 is substantially equal to the model 1 except for a point that a second division line and a third division line are formed such that a distance from an end portion of a first division line to an intersecting point with the first division line is set to 36% of a length of the first division line and, further, a support portion forming line is formed at the center in the first direction such that a length in the first direction is set to 9.1 mm, a projection height in the second direction is set to 3.5 mm, and the support portion forming line has a V shape which is symmetrical with respect to the first direction.

<Model 4>

Figure 10:
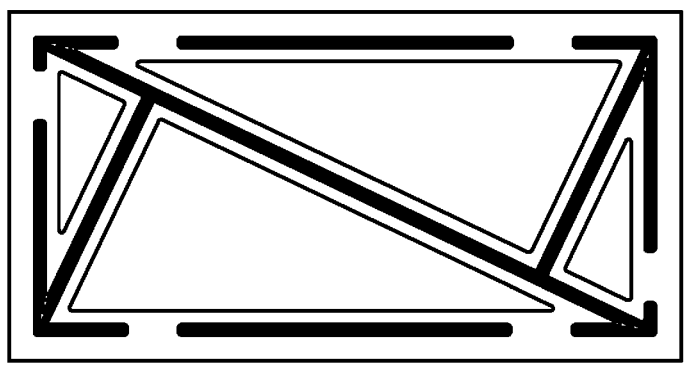
FIG. 10 is a plan view of a model 4 of the rupture valve.

The model 4 shown in FIG. 10 is substantially equal to the model 1 except for a point that a support portion forming line is omitted, and a base line is continuously formed at such a portion where the support portion forming line is omitted.

<Model 5>

Figure 11:
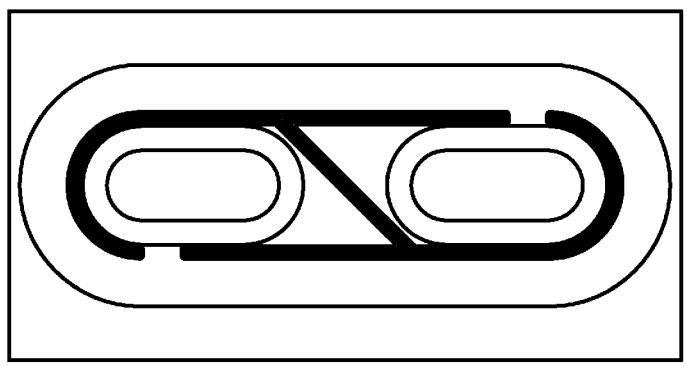
FIG. 11 is a plan view of a model 5 of the rupture valve.

The model 5 shown in FIG. 11 is obtained by modelling a conventionally used rupture valve, wherein a total length is set to 25 mm, a width is set to 6.5 mm, and a wall thickness at a break line forming portion is set to 0.3 mm. A break line is formed such that a wall thickness of the rupture valve at a deepest portion of the break line becomes 0.05 mm. The break line includes: a pair of base lines extending in the first direction; a pair of end lines having a semicircular arc shape and connecting end portions of the base lines; and one division line formed at the center of an opening region in an inclined manner by 45° in the first direction so as to connect the pair of base lines to each other. In the model 5, the pair of base lines is formed such that a length is set to 15.0 mm, and a distance between center lines is set to 5.0 mm.

<Simulation>

A simulation where a pressure of 1.0 MPa is applied to the models 1 to 5 is performed on a computer thus calculating a Mises stress and a maximum deformation amount (a maximum projection height in a normal direction). The result of calculation is collectively shown in the following

TABLE 1

| MODEL No. | MISES STRESS [MPa] | MAXIMUM DEFORMATION AMOUNT [mm] |
| --- | --- | --- |
| 1 | 3140 | 0.45 |
| 2 | 2935 | 0.47 |

TABLE 1-continued

| MODEL No. | MISES STRESS [MPa] | MAXIMUM DEFORMATION AMOUNT [mm] |
| --- | --- | --- |
| 3 | 2687 | 0.45 |
| 4 | 2016 | 0.52 |
| 5 | 3956 | 0.57 |

The Mises stress is a stress acting on an initiation point of rupture. When the Mises stress becomes a rupture stress or more, the rupture valve ruptures. Setting of the rupture pressure of the rupture valve can be performed by adjusting a depth of a break line. Accordingly, the larger the Mises stress is, the accurately the rupture pressure can be set. Under a design condition of the models 1 to 5 (a wall thickness of the rapture valve at a deepest portion of the break line being 0.05 mm), it is experimentally considered that, when the Mises stress is equal to 2500 MPa or more, the rupture pressure can be set relatively accurately.

On the other hand, the maximum deformation amount indicates a magnitude of an amount that the rupture valve is repeatedly deformed due to a fluctuation of a pressure in a normal in-use state of an energy storage device. The smaller the maximum deformation amount, the smaller a fatigue of the rupture valve becomes. Accordingly, a lifetime of the rupture valve is prolonged. The maximum deformation amount has trade-off relationship with the Mises stress.

An area of an opening of the rupture valve of the model 1 according to the example of the present invention is approximately 2.5 times as large as an area of an opening of the rupture valve of the model 5 which is a conventional example. As a result of the simulation, with respect to the rupture valve of the model 1, the Mises stress becomes small compared to the rupture valve of the model 5 and, further, a maximum deformation amount also becomes small compared to the rupture valve of the model 5. To take into account a fact that the Mises stress and the maximum deformation amount have a trade-off relationship, it is expected that an accuracy of the rapture pressure and the lifetime of the rupture valve of the model 1 be equal to or more than an accuracy of the rapture pressure and the lifetime of the rupture valve of the model 5.

In the rupture valve of the model 2 according to another example of the present invention, an intersecting point of division lines is closer to a support portion. Accordingly, a value of the Mises stress and a value of the maximum deformation amount of the rupture valve of the model 2 are slightly inferior compared to the rupture valve of the model 1. However, the rupture valve of the model 2 can be sufficiently used in practical use.

In the rupture valve of the model 3 according to still another example of the present invention, the support portions are formed in right and left symmetrically so that a maximum deformation amount is suppressed compared to the rupture valve of the model 2 although the Mises stress is decreased. Accordingly, although the rupture valve of the model 3 can be sufficiently used in practical use, it is expected an allowable range in manufacturing error is small compared to the rupture valve of the model 2.

In the rupture valve of the model 4 having no support portion which is one of technical features of the present invention, the Mises stress is small, and a maximum deformation amount is relatively large. Accordingly, it is considered difficult for the rupture valve of the model 4 to acquire both an accurate rupture pressure and a sufficient lifetime.

INDUSTRIAL APPLICABILITY

The rupture valve according to one aspect of the present invention is preferably used as a safety valve of an energy storage device. Further, the energy storage device including the rupture valve according to another aspect of the present invention is preferably applicable to a drive source of a vehicle such as an electric vehicle or a plug-in hybrid electric vehicle (PHEV).

DESCRIPTION OF REFERENCE SIGNS

1: rupture valve
2: container
3: electrode assembly
4: break line
5: outer edge line
6: division line
7: first base line
8: second base line
9: first support portion forming line
10: second support portion forming line
11: first end line
12: second end line
13: first support portion
14: second support portion
15: first support thick wall portion
16: second support thick wall portion
17: first division line
18: second division line
19: third division line
20: first lid portion
21: second lid portion
22: third lid portion
23: fourth lid portion
24: first lid thick wall portion
25: second lid thick wall portion
26: third lid thick wall portion
27: fourth lid thick wall portion
28: adjusting groove

The invention claimed is:

1. A rupture valve which is formed on a wall of a container and is opened by being ruptured when an internal pressure in the container is increased, wherein
the rupture valve has a break line along which a wall thickness is decreased,
the break line has an outer edge line which defines an outer edge of an opening region and a plurality of division lines which divide the opening region,
the outer edge line has:
a first base line and a second base line formed discontinuously such that the first base line and the second base line extend in a first direction, and are formed in a spaced-apart manner in a second direction orthogonal to the first direction;
a first support portion forming line formed on a breaking portion of the first base line and extending from the first base line toward the second base line; and
a second support portion forming line formed on a breaking portion of the second base line and extending from the second base line toward the first base line, wherein
the first support portion forming line and the second support portion forming line are apart.

2. The rupture valve according to claim 1, wherein the plurality of division lines have an intersecting point, and
an initiation point of rupture comprises the intersecting point of the plurality of division lines.

3. The rupture valve according to claim 1, wherein the plurality of division lines include:
a first division line which connects the first base line and the second base line to each other;
a second division line which connects the first base line and the first division line to each other; and
a third division line which connects the second base line and the first division line to each other.

4. The rupture valve according to claim 3, wherein a distance from an end portion of the first division line to the intersecting point between the second division line and the first division line is ¼ or less of a length of the first division line.

5. An energy storage device comprising:
a container which comprises the rupture valve according to claim 1; and
an electrode assembly accommodated in the container.

6. The rupture valve according to claim 1, wherein the plurality of division lines have a plurality of intersecting points, and
a plurality of initiation points of rupture comprise the plurality of intersecting points of the plurality of division lines.

7. The rupture valve according to claim 1, wherein the first support portion forming line and the second support portion forming line are separated.

8. The rupture valve according to claim 1, wherein the first support portion forming line and the second support portion forming line are out of contact with each other.

9. The rupture valve according to claim 1, wherein the first support portion forming line and the second support portion forming line do not contact with each other.

10. The rupture valve according to claim 1, wherein a shape of the first and second support portion forming lines comprise two sides respectively inclined in the first direction and the second direction so as to form a corner at distal ends of the two sides.

11. The rupture valve according to claim 1, wherein the first and second support forming lines define support portions which project inward as viewed in a plan view of the opening region of the rupture valve.

12. The rupture valve according to claim 1, wherein a distance from an end portion of a first division line of a plurality of division lines to an intersecting point between a second division line of a plurality of division lines and the first division line is ¼ or less of a length of the first division line.

13. The rupture valve according to claim 1, wherein the first support portion forming line is formed into an asymmetrical shape having an oblique side parallel to a first division line and an other oblique side parallel to a second division line.

14. A rupture valve which is formed on a wall of a container and is opened by being ruptured when an internal pressure in the container is increased, wherein
the rupture valve has a break line along which a wall thickness is decreased,
the break line has an outer edge line which defines an outer edge of an opening region and a plurality of division lines which divide the opening region,
the outer edge line has:
a first base line and a second base line formed discontinuously such that the first base line and the second base line extend in a first direction, and are formed in a spaced-apart manner in a second direction orthogonal to the first direction;
a first support portion forming line formed on a portion of the first base line and extending from the first base line toward the second base line in an inclined manner; and
a second support portion forming line, separated from the first support portion forming line, formed on a breaking portion of the second base line and extending from the second base line toward the first base line in an inclined manner.

15. The rupture valve according to claim 14, wherein a distance from an end portion of a first division line of a plurality of division lines to an intersecting point between a second division line of a plurality of division lines and the first division line is ¼ or less of a length of the first division line.

16. The rupture valve according to claim 14, wherein the plurality of division lines include:
   a first division line which connects the first base line and the second base line to each other;
   a second division line which connects the first base line and the first division line to each other, and
   a third division line which connects the second base line and the first division line to each other.

17. The rupture valve according to claim 14, wherein the first support portion forming line and the second support portion forming line are out of contact with each other.

18. The rupture valve according to claim 14, wherein the first support portion forming line and the second support portion forming line do not contact with each other.

19. The rupture valve according to claim 16, wherein a distance from an end portion of the first division line to the intersecting point between the second division line and the first division line is ¼ or less of a length of the first division line.

20. A rupture valve which is formed on a wall of a container and is opened by being ruptured when an internal pressure in the container is increased, wherein
the rupture valve has a break line along which a wall thickness is decreased,
the break line has an outer edge line which defines an outer edge of an opening region and a plurality of division lines which divide the opening region,
the outer edge line has:
a first base line and a second base line formed discontinuously such that the first base line and the second base line extend in a first direction, and are formed in a spaced-apart manner in a second direction orthogonal to the first direction;
a first support portion forming line formed on a breaking portion of the first base line and extending from the first base line toward the second base line; and
a second support portion forming line formed on a breaking portion of the second base line and extending from the second base line toward the first base line,
wherein the plurality of division lines include:
a first division line which connects the first base line and the second base line to each other;
a second division line which connects the first base line and the first division line to each other; and
a third division line which connects the second base line and the first division line to each other, and
wherein a distance from an end portion of the first division line to the intersecting point between the second division line and the first division line is ¼ or less of a length of the first division line.

* * * * *